US007531017B2

(12) United States Patent
Ryan et al.

(10) Patent No.: US 7,531,017 B2
(45) Date of Patent: *May 12, 2009

(54) LATERAL-FLOW BIOHAZARD SAFETY ENCLOSURE

(75) Inventors: Raymond F. Ryan, Leland, NC (US); John H. McNally, Oak Island, NC (US)

(73) Assignee: Flow Sciences, Inc., Leland, NC (US)

( * ) Notice: Subject to any disclaimer, the term of this patent is extended or adjusted under 35 U.S.C. 154(b) by 506 days.

This patent is subject to a terminal disclaimer.

(21) Appl. No.: 11/135,085

(22) Filed: May 23, 2005

(65) Prior Publication Data

US 2005/0217223 A1 Oct. 6, 2005

Related U.S. Application Data

(63) Continuation-in-part of application No. 10/628,179, filed on Jul. 28, 2003, now Pat. No. 6,896,712.

(51) Int. Cl.
*B01D 50/00* (2006.01)

(52) U.S. Cl. .......................... 55/385.2; 55/356; 55/467; 55/496; 55/505; 55/506; 55/508; 55/DIG. 18; 454/187

(58) Field of Classification Search ................ 55/385.2, 55/356, 467, 496, 505, 506, 508, DIG. 18, 55/385.1, 485, 486, 497; 454/187
See application file for complete search history.

(56) References Cited

U.S. PATENT DOCUMENTS 3,363,539 A 1/1968 Taylor et al.
3,729,905 A 1/1968 Taylor et al.
3,811,250 A 5/1974 Fowler, Jr.
3,895,570 A 7/1975 Eagleson, Jr.
3,926,597 A 12/1975 Landy
3,944,405 A 3/1976 van Calsteren et al.
4,098,174 A 7/1978 Landy
4,100,847 A 7/1978 Norton
4,249,463 A 2/1981 Hornby
4,548,627 A 10/1985 Landy
4,637,301 A 1/1987 Shields
4,832,717 A 5/1989 Peters
4,927,438 A * 5/1990 Mears et al. ............... 55/385.2
5,295,902 A 3/1994 Hock
5,380,244 A 1/1995 Tipton
5,665,128 A 9/1997 Peters et al.
6,010,400 A 1/2000 Krainiak et al.

(Continued)

*Primary Examiner*—Duane S Smith
*Assistant Examiner*—Minh-Chau T Pham
(74) *Attorney, Agent, or Firm*—MacCord Mason PLLC

(57) ABSTRACT

A biohazard safety enclosure or workstation particularly adapted for enclosing automated instrumentation includes a chamber defined by front, back, top, bottom, and opposed end walls; a HEPA filter across an air inlet opening into the chamber, and an airflow means to direct air horizontally through at least part of the chamber between the end walls. Preferably, the workstation has a second HEPA filter across an air outlet opening in the work chamber, with the airflow means including a conduit extending from the air outlet opening to the air inlet opening. A fan draws air through the conduit. All of the air can be exhausted from the workstation, or a part of the filtered air can be exhausted from the workstation and replenished through a make-up air inlet into the chamber.

5 Claims, 4 Drawing Sheets

U.S. PATENT DOCUMENTS 6,036,737 A 3/2000 Smith et al.
6,090,188 A * 7/2000 Yang et al. .................... 95/285
6,102,977 A * 8/2000 Johnson ..................... 55/385.2
6,284,020 B1 * 9/2001 Mizuno et al. ................. 95/26
6,368,206 B1 4/2002 Hunter et al.
6,777,355 B2 * 8/2004 Kisakibaru et al. .......... 438/800
6,896,712 B2 * 5/2005 Ryan et al. ................. 55/385.2
6,929,672 B1 * 8/2005 Wakayama et al. ........ 55/385.2
2007/0039294 A1 * 2/2007 Airey ........................ 55/385.2

* cited by examiner

LATERAL-FLOW BIOHAZARD SAFETY ENCLOSURE

This application is a continuation-in-part of U.S. patent application Ser. No. 10/628,179, filed Jul. 28, 2003 now U.S. Pat. No. 6,896,712.

BACKGROUND OF THE INVENTION

1. Field of the Invention

The present invention relates to laboratory safety enclosures for use in handling biohazard materials, and in particular to laboratory safety enclosures for use in housing automated instrumentation used in the handling of biohazard materials.

2. Description of the Prior Art

Laboratory safety enclosures, also known as vented workstations, are safety devices used in research, analytical, teaching, and other laboratories. These containment devices provide enclosed work areas where handling of toxic substances can be performed with minimum risk to users. They are used primarily in pharmaceutical, chemical, biological and toxicological laboratory settings.

Specifically, a laboratory safety enclosure is comprised of a work chamber within which materials are manipulated or worked upon by an operator, a means for introducing uncontaminated air into the chamber, an air exhaust mechanism for removing contaminated air from the enclosure, and a means such as a HEPA filter for removing hazardous contaminants from the air before exhausting the air from the workstation, or returning the air to the work chamber.

The enclosure is comprised of a work chamber with an access opening and an exhaust or discharge opening. The enclosure may include a pair of spaced, parallel side walls; rear and upper walls joining the side walls; and a bottom wall or floor that together define the work chamber. The chamber also has an access opening or inlet through which the operator inserts, removes or manipulates material within the chamber. Exterior air, i.e., air from outside the workstation, can enter the chamber through this access opening. In some workstation designs a top or bottom bypass is also provided for this purpose. A moveable closure can be employed to vary the size of, or close, the access opening. Air is exhausted from the work chamber through an opening that may be located on the opposite side of the chamber from the access opening.

Air exhausted from the chamber may be discharged to the atmosphere, i.e., to the exterior of the workstation, such as into the room where the workstation is located, or outside the building. Before being discharged, the air is directed through a HEPA filter to remove contaminants. Instead of discharging the air to the atmosphere, a part or all of the air may be returned to the work chamber after passing through the HEPA filter.

In designing a workstation, one of the primary goals is to minimize turbulence of the airflow. The resulting laminar flow structure promotes containment efficiency without affecting balance readings, dispersing light powders or otherwise compromising process efficiency. In addition, laminar airflow across the work chamber avoids "dead spots" or stagnant areas where contaminated air can reside without being exhausted from the chamber.

In a conventional laboratory workstation, the chamber is configured with the access opening, and optionally air inlets, at the front of the chamber, and exhaust openings in the bottom and/or rear of the chamber. If a part of the exhausted air is to be filtered and returned to the work chamber, a return inlet is normally provided in the upper wall of the chamber.

This configuration is suitable for workstations in which an operator manipulates small volumes of material through the access opening. However, many laboratory and manufacturing procedures now require isolation from the environment of automated instrumentation that is simply too large to conveniently fit within a conventionally designed workstation, while still achieving the desired non-turbulent airflow.

SUMMARY OF THE INVENTION

The present invention relates to laboratory safety enclosures, referred to herein as vented workstations for brevity, particularly adapted to enclose automated instruments used to manipulate biohazardous materials, or to make available a large work surface for other purposes, while providing a non-turbulent, non-stagnant airflow though the work chamber. Basically, the workstation of the invention is comprised of an enclosure having a front wall, a back wall, a top wall, a bottom wall, and first and second opposed end walls, the walls together defining a chamber. The chamber has an air inlet opening and an air outlet opening, with a high efficiency filter between at least one of the openings and the chamber. It will be understood that the term "opening" as used herein encompasses an entire wall, as well as an opening within a wall. An airflow means directs air along a horizontal pathway through at least a part of the chamber between the end walls. In some embodiments, an air exhaust is provided downstream of the filter to exhaust a part of the filtered air, and a make-up air inlet into the chamber is provided for introduction of make-up air.

Preferably, the workstation chamber includes two HEPA filters, one covering the air inlet opening and one covering the air outlet opening. The inlet and outlet openings may be located in opposed end walls, with the filters being oriented parallel to each other and perpendicular to the horizontal pathway. Depending upon the particular embodiment of the invention, more than one air inlet opening or air outlet opening may be used. Also, instead of both openings being in end walls, at least one of the openings may be in a chamber wall other than an end wall, e.g., a top or back wall.

The components of the workstation may be assembled in different ways while still achieving the objectives of the invention, so long as airflow is created along a horizontal pathway through at least a part of the workstation chamber. In one embodiment of the invention, an enclosure having top, bottom, back, front and opposed end walls is provided, with an air inlet opening in one end wall and an air outlet opening in the opposite end wall. A non-loading HEPA filter is positioned over the air inlet opening, while a loading HEPA filter is positioned at the opposite end of the work chamber over the air outlet opening. The filters are oriented parallel to each other and perpendicular to a horizontal pathway through the chamber and between the filters. A conduit extends between the exterior of the filters, with a fan being positioned to draw air from the chamber through the loading HEPA filter interior and into the chamber interior through the non-loading HEPA filter. The conduit includes an exhaust port of opening downstream of the fan to discharge air from the workstation, and an inlet into the chamber, e.g., in the front wall of the enclosure to introduce make-up air from outside the workstation. A doorway or closeable inlet may also be provided for access to the chamber interior.

A second embodiment of the invention is constructed similar to the first embodiment, except that the air inlet opening is located in a wall other than an end wall, e.g., the top wall. Preferably, the air inlet opening is adjacent an end wall to maximize the length of the horizontal pathway. In order to facilitate the creation of air flow along the horizontal pathway, this embodiment may also include deflector or turning vanes in front of the filter covering the air inlet opening, with the vanes being angled inwardly toward the opposite end of the chamber.

In another embodiment of the invention, an enclosure having top, bottom, back, front and opposed end walls is provided, with air inlet openings in both end walls and an air outlet opening in a wall other than an end wall. Preferably, the air outlet opening is located approximately equidistant between the end walls, e.g., in the back wall of the enclosure. Non-loading HEPA filters are positioned over the air inlet openings, while a loading HEPA filter is positioned over the air outlet opening. Conduits extend from the air outlet opening to the air inlet openings, with a fan being positioned to draw air from the chamber interior through the loading HEPA filter and into the chamber interior through the non-loading HEPA filters. The conduits include exhaust ports downstream of the fan to discharge air from the workstation. An inlet into the chamber, e.g., in the front wall of the enclosure opposite the air outlet opening, is provided to introduce make-up air from outside the workstation. A doorway or closeable inlet is also provided for access to the chamber interior. Alternatively, the air flow can be reversed with the air entering the opening in a wall other than an end wall and then exhausted through the end walls.

Instead of recirculating a part of the air from the outlet to the inlet through the return conduit and making up the difference with air entering the makeup inlet, all of the air exhausted through the exhaust opening can be discharged from the workstation, with all of the air passing through the workstation entering the inlet opening. That is, the conduit extending from the air outlet opening to the air inlet opening can be omitted, and the fan can be used only to draw air in through the inlet opening, through the workstation chamber and out of the outlet opening for discharge.

Preferably, both the inlet and outlet are covered by filters in this latter embodiment, with the filters being parallel to each other. Also, the chamber transverse cross-section is preferably of a cross-section approximately equal to the surface area of the filters, which are of the same size, so that laminar flow will be promoted across all areas of the chamber. For example, the chamber transverse cross-sectional area may be rectangular, with the filters having rectangular surfaces of approximately the same size as the transverse cross-sectional area. The filters are preferably parallel to each other and transverse to the horizontal pathway of the laminar airflow. A plenum may extend over the exterior of the outlet opening with a fan being in communication with the plenum to draw air from the outlet opening and convey the air to a discharge opening remote from the workstation.

It has been found that the present configuration provides significant advantages over prior art vented workstations. A larger chamber is available, permitting the enclosure of automated instruments used to manipulate biological materials; laminar airflow through the chamber is possible; and ease of operator access into the chamber is provided. By positioning a HEPA filter between the air outlet opening and the fan, contamination of the fan is avoided, facilitating cleaning and replacement, if needed.

DETAILED DESCRIPTION OF THE PREFERRED EMBODIMENT

Figure 1:
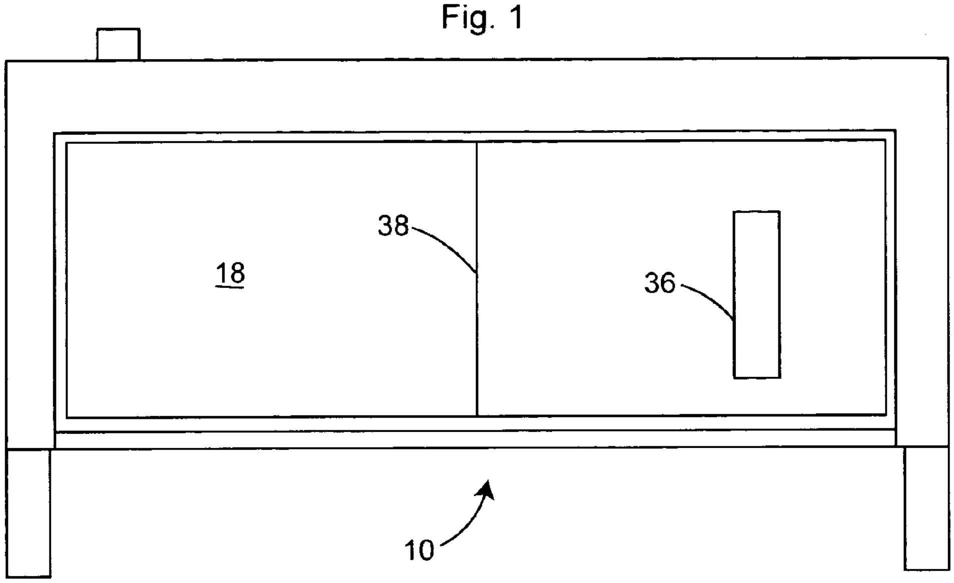
FIG. 1 is a front view of a preferred embodiment of the invention.
Figure 2:
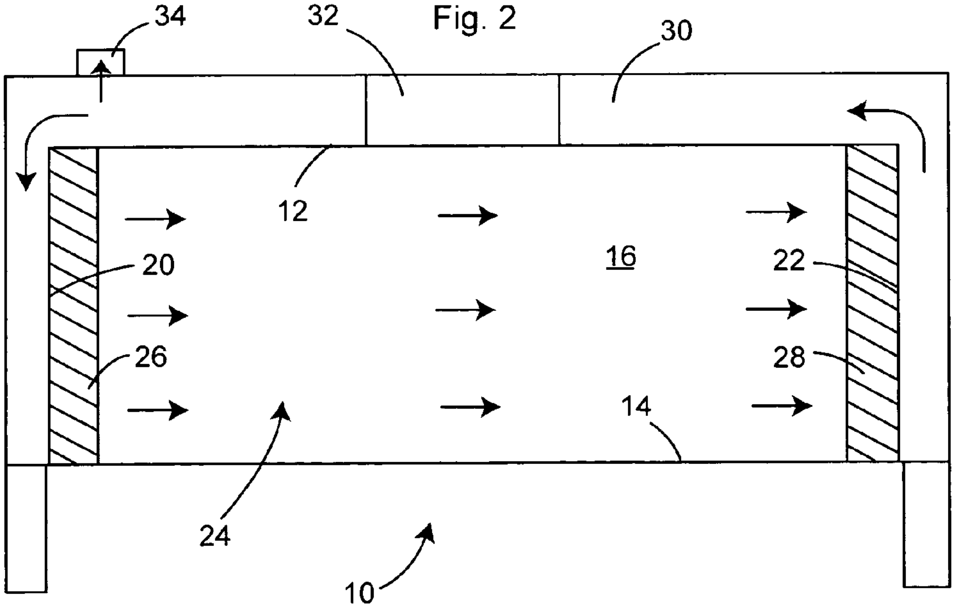
FIG. 2 is a sectional front view of the preferred embodiment of the invention.

FIGS. 1 and 2 illustrate a preferred workstation, generally 10, comprised of a top wall 12, bottom wall 14, back wall 16, front wall 18, first end wall 20 and opposite second end wall 22. The walls together form a work chamber 24. Non-loading HEPA filter 26 is positioned across end wall 20, while a loading HEPA filter 28 is positioned across end wall 22. Conduit 30 extends between the exterior of the filters, with fan 32 being positioned to draw air from chamber 24 through HEPA filter 28 and into chamber 24 through non-loading HEPA filter 26. Conduit 30 includes an exhaust port 34 downstream of fan 32 to discharge air from workstation 10. Inlet 36 into chamber 24 is provided for introduction of make-up air. Closeable inlet 38 is also provided for access to chamber 24.

Figure 3:
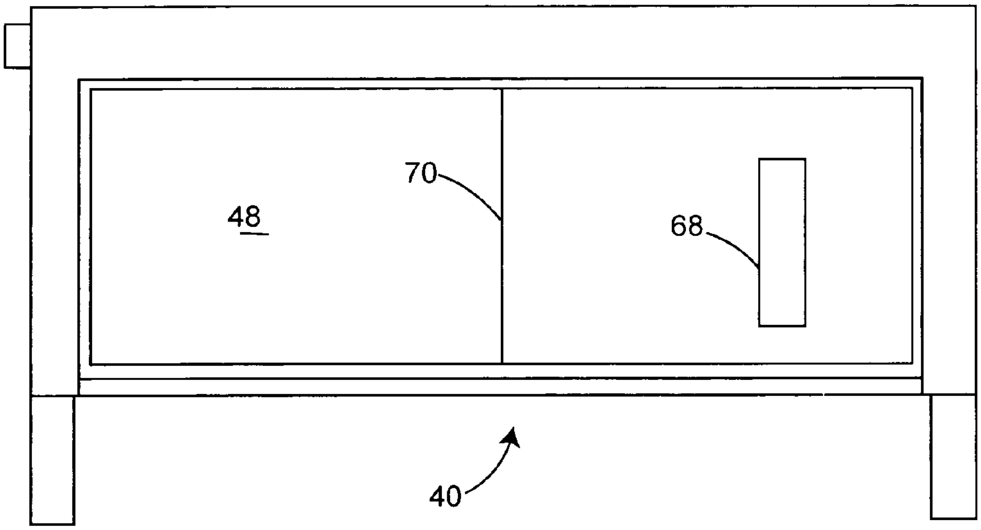
FIG. 3 is a front view of a second embodiment of the invention.
Figure 4:
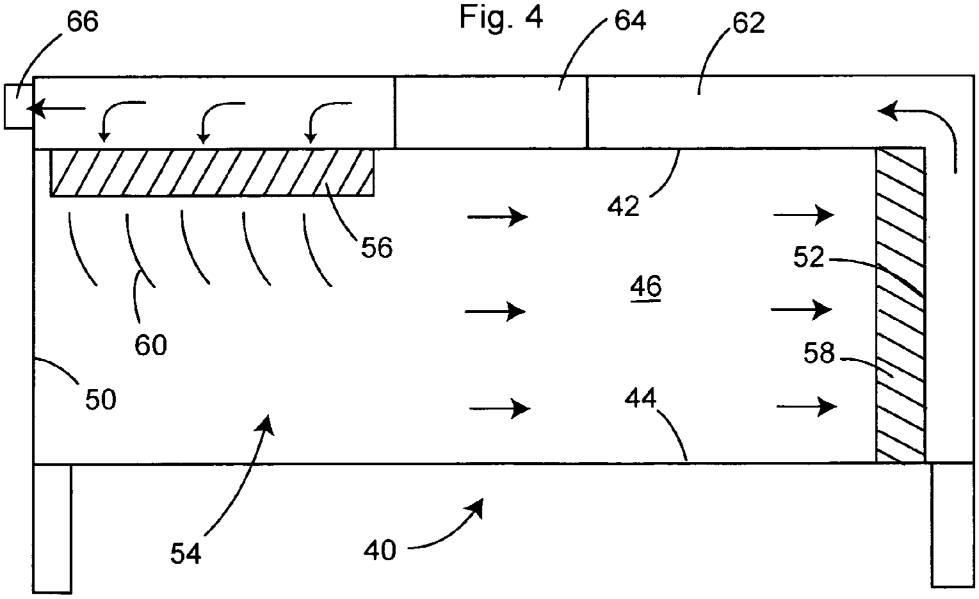
FIG. 4 is a sectional front view of the second embodiment of the invention.

A second embodiment of the invention, generally 40, illustrated in FIGS. 3 and 4, is comprised of top wall 42, bottom wall 44, back wall 46, front wall 48, first end wall 50 and opposite second end wall 52. The walls together form a work chamber 54. Non-loading HEPA filter 56 is positioned in top wall 42 adjacent first end wall 50, while a loading HEPA filter 58 is positioned across end wall 52. Turning vanes 60 orient air from filter 56 to along a horizontal pathway through chamber 54.

Conduit 62 extends between the exterior of the filters, with fan 64 being positioned to draw air from chamber 54 through HEPA filter 58 and into chamber 54 through non-loading HEPA filter 56. Conduit 62 includes an exhaust port 66 downstream of fan 64 to discharge air from workstation 40. Inlet 68 into chamber 54 is provided for introduction of make-up air. Closeable inlet 70 is also provided for access to chamber 24.

Figure 5:
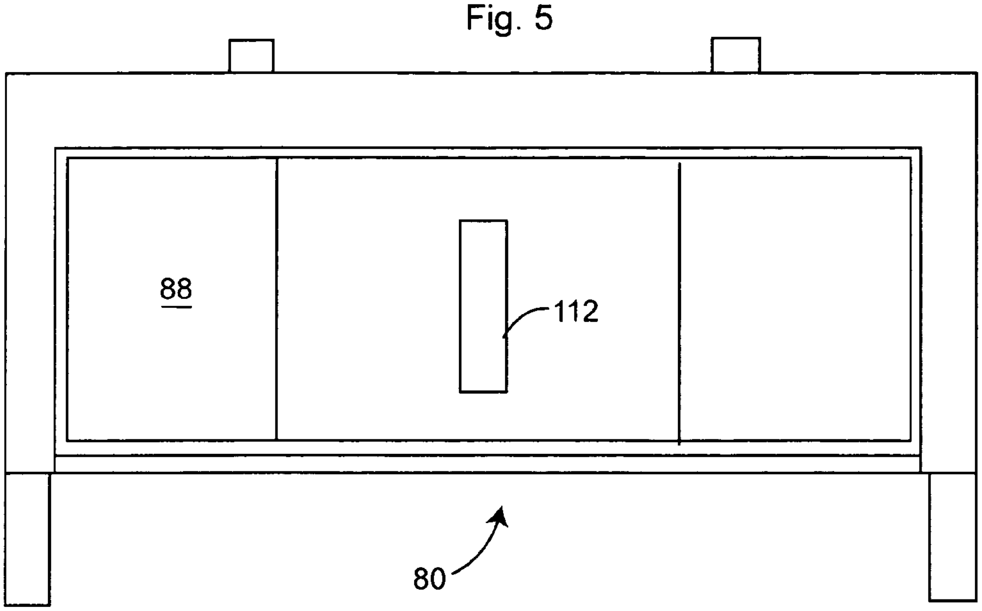
FIG. 5 is a front view of a third embodiment of the invention.
Figure 6:
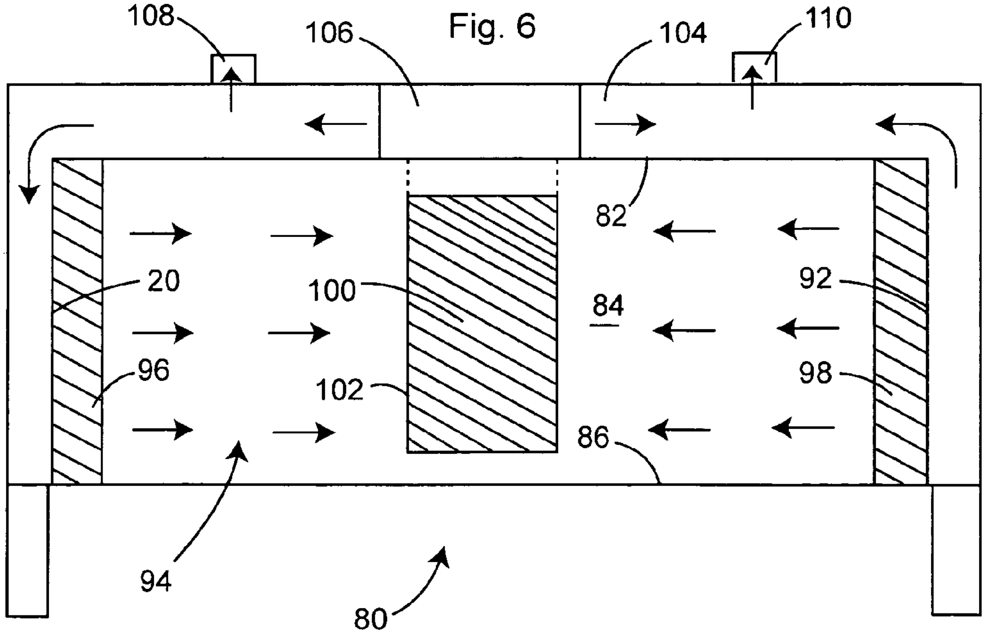
FIG. 6 is a sectional front view of the third embodiment of the invention.

Another embodiment of the invention, generally 80, illustrated in FIGS. 5 and 6, is comprised of top wall 82, bottom wall 84, back wall 86, front wall 88, first end wall 90 and opposite second end wall 92. The walls together form a work chamber 94. Non-loading HEPA filters 96 and 98 are positioned across end walls 90 and 92, respectively. Loading HEPA filter 100 is positioned across a central opening 102 in back wall 86.

Conduit 104 extends from opening 102 to end walls 90 and 92. Fan 106 draws air from chamber 94 through HEPA filter 100 and back into chamber 94 through HEPA filters 96 and 98. Conduit 104 includes exhaust ports 108 and 110 on opposite sides of fan 106. Inlet 112 in front wall 88 is provided for introduction of make-up air into chamber 94.

Figure 7:
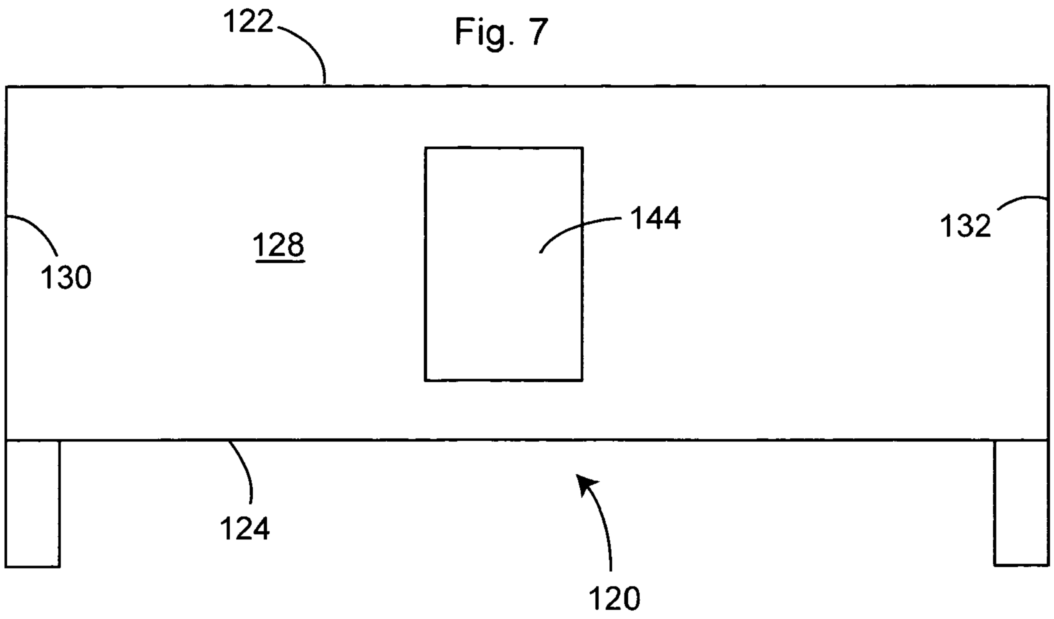
FIG. 7 is a front view of a fourth embodiment of the invention without the return conduit.
Figure 8:
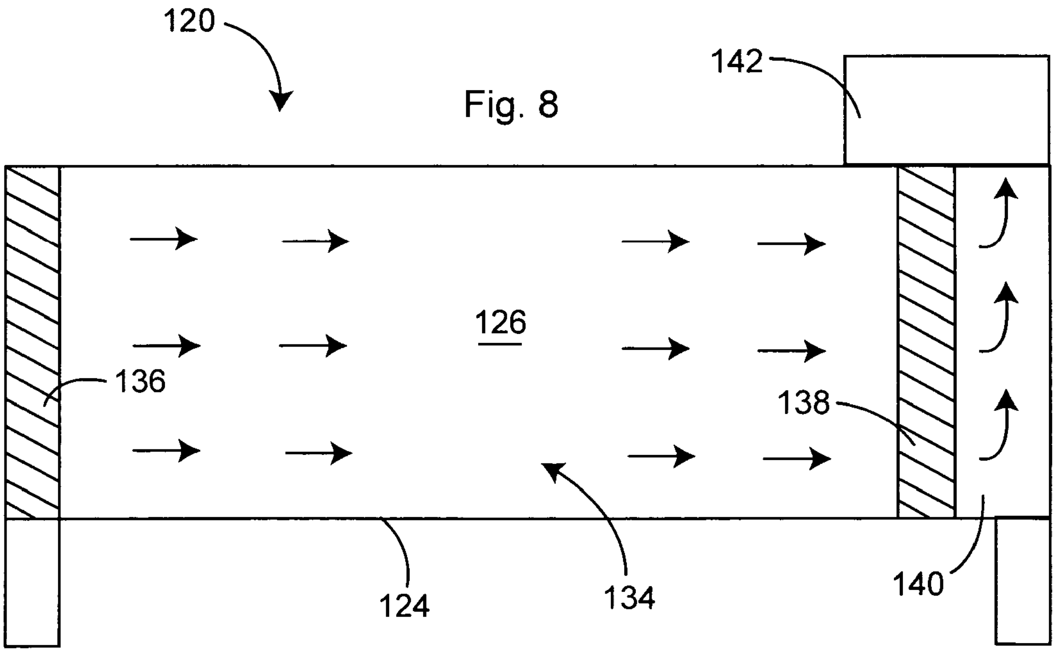
FIG. 8 is a sectional front view of the fourth embodiment of the invention.

As illustrated in FIGS. 7 and 8, the workstation of the present invention may also be constructed without a return conduit, replacing all of the air from outside the workstation through the air inlet. As shown, workstation, generally 120, is comprised of a horizontal top wall 122, horizontal bottom wall 124, vertical back wall 126, vertical front wall 128, vertical first end wall 130 and opposite vertical second end wall 132. The walls together form a work chamber 134.

Non-loading HEPA filter 136 is positioned across end wall 130, while a loading HEPA filter 138 is positioned across end wall 132. Filters 136 and 138 extend substantially entirely across end walls 130 and 132, respectively, and have a surface area approximately equal to the transverse cross-sectional area of chamber 134. Plenum 140 is positioned over the exterior of wall 132 to direct air to enclosed fan 142 where the filtered air is then exhausted from the workstation. One or more closable access doors 144 may be included in one or more of the workstation walls.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A workstation comprising:

a) an enclosure having a vertical front wall, a vertical back wall, a horizontal top wall, a horizontal bottom wall, a vertical first end wall and an opposite vertical second end wall, said enclosure having a rectangular transverse cross-sectional surface area;

b) a first filter extending substantially across said first end wall;

c) a second filter extending substantially across said second end wall, said first and second filters being parallel to each other and having cross-sectional areas approximately equal to the transverse cross-sectional area of said enclosure said walls defining a workstation chamber;

d) airflow means to direct air into said enclosure through said first filter, along a horizontal laminar flow pathway through said chamber between said end walls, out of said chamber though said second filter, and away from said enclosure without returning air to said enclosure; and e) a closable door in said front wall to provide access into said chamber.

2. The workstation of claim 1, wherein said first filter is a non-loading HEPA filter.

3. The workstation of claim 1, wherein said second filter is a loading HEPA filter.

4. The workstation of claim 1, wherein said airflow means is a fan positioned downstream from said second filter.

5. The workstation of claim 1, further including a plenum to direct air from said second filter to said airflow means.

* * * * *